(12) United States Patent
Khaledian et al.

(10) Patent No.: US 11,605,896 B2
(45) Date of Patent: Mar. 14, 2023

(54) COMMUNICATION DEVICE HAVING METALLIC FRAME THAT INCLUDES A T-SHAPED SLOT ANTENNA

(71) Applicant: MOTOROLA MOBILITY LLC, Chicago, IL (US)

(72) Inventors: Seiran Khaledian, Chicago, IL (US); Farhad Farzami, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 153 days.

(21) Appl. No.: 16/850,933

(22) Filed: Apr. 16, 2020

(65) Prior Publication Data

US 2021/0328354 A1    Oct. 21, 2021

(51) Int. Cl.
| | | |
|---|---|---|
| *H01Q 13/10* | (2006.01) | |
| *H01Q 1/22* | (2006.01) | |
| *H01Q 21/06* | (2006.01) | |
| *H01Q 1/24* | (2006.01) | |
| *H01Q 1/38* | (2006.01) | |
| *H04M 1/02* | (2006.01) | |

(52) U.S. Cl.
CPC ........... *H01Q 13/10* (2013.01); *H01Q 1/2291* (2013.01); *H01Q 1/243* (2013.01); *H01Q 1/38* (2013.01); *H01Q 21/064* (2013.01); *H04M 1/022* (2013.01)

(58) Field of Classification Search
CPC ...... H01Q 13/10; H01Q 1/2291; H01Q 1/243; H01Q 1/38; H01Q 21/064; H04M 1/022; H04M 1/026
See application file for complete search history.

(56) References Cited

U.S. PATENT DOCUMENTS

| | | | |
|---|---|---|---|
| 9,666,934 B2 | 5/2017 | Lombardi et al. | |
| 9,801,006 B2 | 10/2017 | Olgun et al. | |
| 2005/0054399 A1* | 3/2005 | Buris | H01Q 19/10 455/575.1 |
| 2013/0207851 A1* | 8/2013 | Dabov | H01Q 7/00 343/702 |
| 2016/0226130 A1 | 8/2016 | Allore et al. | |
| 2016/0248147 A1* | 8/2016 | Zhang | H01Q 1/243 |
| 2018/0042130 A1* | 2/2018 | Li | H04M 1/0283 |

OTHER PUBLICATIONS

Stanley, et al., "A Novel Reconfigurable Metal Rim Integrated Open Slot Antenna for Octa-Band Smartphone Applications", IEEE Transactions on Antennas and Propagation, vol. 65, No. 7, pp. 3352-3363, Jul. 2017.

* cited by examiner

*Primary Examiner* — David E Lotter
(74) *Attorney, Agent, or Firm* — Isidore PLLC

(57) ABSTRACT

A communication device is made with a metallic frame having an interior mounting surface for receiving one or more functional components. The metallic frame includes a first frame member having a first portion extending uninterrupted across one lateral side of the metallic frame. The first portion provides structural support to the communication device. A T-shaped slot antenna is formed in a second portion of the first frame member adjacent to the first portion. The T-shaped slot antenna has first and second arms separated at a gap and partially encompassing a slot. The second portion of the first frame member enables radio frequency communication by at least one of the functional components via the T-shaped slot antenna of the communication device.

16 Claims, 16 Drawing Sheets

COMMUNICATION DEVICE HAVING METALLIC FRAME THAT INCLUDES A T-SHAPED SLOT ANTENNA

1. TECHNICAL FIELD

The present disclosure relates generally to wireless communication devices, and more particularly to wireless communication devices having antennas conformably integrated within an outer surface of the device.

2. DESCRIPTION OF THE RELATED ART

Communication devices, such as smartphones, incorporate a number of antennas to support multiple frequency bands assigned to various types of communication networks. Recent designs of communication devices also incorporate an increasing number of antennas for spatial diversity and directional antenna gain via multiple-in multiple output (MIMO) operations. Given a preference for conformably integrating the antennas within the form factor of the communication device, antennas are often formed in a metallic portion of a housing of a communication device. Burying antennas within the structure of the communication device significantly degrades antenna performance. For example, smartphones that have a "candy bar" form factor can have a bezel area surrounding a display or housing cover that includes slot antennas. Even for a unitary shape like the candy bar form factor, additional area near the surface of the communication device is needed for more antennas. Displays tend to dominate or fully cover at least a front side of the communication device. Smartphones having a "flip phone" form factor further reduce available surface area by having surfaces that are "buried" when the communication device is folded or closed.

Current attempts to provide additional antennas includes use of laser direct structuring (LDS) technology to produce high-performing three-dimensional antennas directly onto a molded three-dimensional surface. Electrically connecting these antennas creates assembly issues, increasing the cost of manufacturing. There are also limited external areas of the housing available for placing the LDS-produced antennas to achieve satisfactory antenna performance. For example, 2.4 GHz transmissions for wireless local access networks (WLANs) require placement of antennas at an outer surface or edge of the communication device. Other attempts have been made to form an antenna along an outer frame or housing of the communication device. The metallic structure is transversely cut to form the antenna, reducing structural integrity of the device. The resulting structure is weakened and does not resist bending of the communication device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
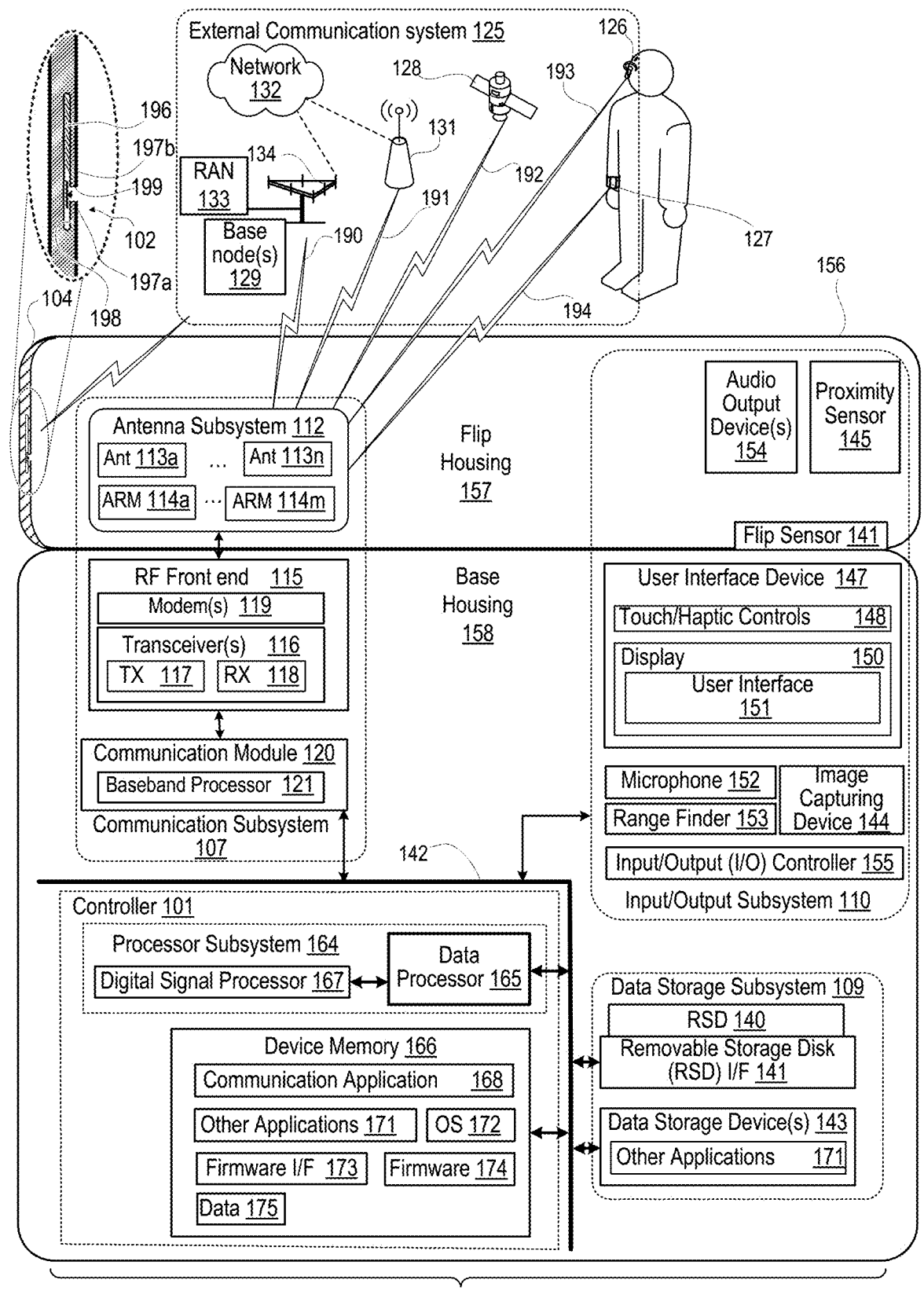
FIG. 1 illustrates a functional block diagram of a flip-styled communication device having a T-shaped slot antenna formed in a metallic frame, according to one or more embodiments.

According to aspects of the present disclosure, a communication device provides a T-shaped slot antenna that is for dual band communication and is part of the structural support for the communication device. An opening along one side of slot forms two arms, of different lengths to have different resonate frequencies. In one or embodiments, the T-shaped slot antenna extends along a lateral edge of the communication device, where the lateral edge is unimpeded by opening or closing or rotating a movable portion of the communication device, maintaining 180° external exposure. A metallic frame of the communication device has an interior mounting surface for receiving functional component(s). The metallic frame includes a first frame member having a first portion extending uninterrupted across one lateral side of the metallic frame. The first portion provides structural support to the communication device. The T-shaped slot antenna is formed in a second portion of the first frame member adjacent to the first portion. The T-shaped slot antenna has first and second arms separated at a gap and partially encompassing a slot. The second portion of the first frame member enables radio frequency communication by the functional component(s) via the T-shaped slot antenna of the communication device.

According to aspects of the present disclosure, a method of making a communication device includes making a first frame member from metallic stock material, the first frame member having a first portion and a second portion that extend longitudinally adjacent. The method includes making a T-shaped slot antenna in the second portion of the first frame member. The T-shaped slot antenna has first and second arms separated at a gap and partially encompassing a slot. The method includes attaching at least one housing structure to the first frame member to form a metallic frame of a communication device to provide an interior mounting surface for receiving one or more functional components of the communication device. The second portion of the first frame member enables radio frequency communication by at least one of the functional components via the T-shaped slot antenna of the communication device.

According to aspects of the present disclosure, a communication device has a first frame member including a first portion that resists bending and twisting. The first frame member includes second portion having a T-shaped slot antenna that is adjacent to the first portion. The T-shaped slot antenna has first and second arms separated at a gap and partially encompassing a slot. The first and the second arms have a different length to create a corresponding first and second antenna resonant frequency of the slot. A radio frequency (RF) front end of the communication device is supported by the first frame member and electrically coupled via a lead line that is electromagnetically coupled to the slot. A memory of the communication device contains a communication application. A controller of the communication device is communicatively coupled to the RF front end and the memory. The controller executes the communication application to enable the RF front end to: (i) communicate with a first remote device via at least one of an uplink channel and a downlink channel at the first antenna resonant frequency of the slot; and (ii) communicate with a second remote device via at least one of an uplink channel and a downlink channel at the second antenna resonant frequency of the slot.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device in an operating environment within which the features of the present disclosure are advantageously implemented. In particular, communication device 100, controlled by controller 101, is an example of an electronic device that has T-shaped slot antenna 102 in metallic frame 104 that resists twisting and bending. In one or more embodiments, communication device 100 has a flip form factor with side placement of T-shaped slot antenna 102 that is unimpeded regardless of whether communication device 100 is in an open or closed position. Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that includes wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, user equipment (UE), a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In one or more embodiments, communication device 100 includes over-the-air (OTA) or wireless communication subsystem 107, data storage subsystem 109, and input/output subsystem 110, with each subsystem being controlled by controller 101. Antenna subsystem 112 of wireless communication subsystem 107 includes T-shaped slot antenna 102, other antennas 113a-113n, and antenna array modules (ARMs) 114a-114m. In one or more embodiments, T-shaped slot antennas 102 supports cellular service in the upper frequency bands assigned to fourth generation (4G) LTE radio access technology (RAT) and lower frequency bands assigned to fifth generation (5G) new radio (NR) RAT. Antennas 113a-113n support lower frequency bands such as ultra-high band (UHB). ARMs 114a-114m support multiple input multiple output (MIMO) communication in higher frequency bands, such as millimeter Wave (mmWave). Wireless communication subsystem 107 includes RF front end 115 having transceiver(s) 116 that includes transmitter(s) ("TX") 117 and receiver(s) ("RX") 118. RF front end 115 further includes modem(s) 119. Wireless communication subsystem 107 includes communication module 120 having baseband processor 121. Baseband processor 121 communicates with controller 101 and RF front end 115. As described in more detail below, wireless communication subsystem 107 communicates with external communication system 125.

External communication system 125 can include devices such as wireless headset 126 and smart watch 127. External communication system 125 can include global positioning system (GPS) satellites 128, base node(s) 129, access node 131, and networks 132. Base node(s) 129, which correspond to radio access networks (RANs) 133, wirelessly transmit and receive communication via radio tower 134.

Data storage subsystem 109 of communication device 100 includes data storage device(s) 143. Controller 101 is communicatively connected, via system interlink 142, to data storage device(s) 143. Data storage subsystem 109 provides nonvolatile storage that is accessible by controller 101. For example, data storage subsystem 109 can provide a large selection of other applications 171 that can be loaded into device memory 166. In one or more embodiments, data storage device(s) 143 includes hard disk drives (HDDs), optical disk drives, solid state drives (SSDs), etc. Data storage subsystem 109 of communication device 100 can include removable storage device(s) (RSD(s)) 140, which is received in RSD interface 141. Controller 101 is communicatively connected to RSD 140, via system interlink 142 and RSD interface (UF) 141. In one or more embodiments, RSD 140 is a non-transitory computer program product or computer readable storage device. Controller 101 can access RSD 140 to provision communication device 100 with program code. When executed by controller 101, the program code causes or configures communication device 100 to provide the functionality described herein.

I/O subsystem 110 includes flip sensor 141, image capturing device 144, and proximity sensor 145. I/O subsystem 110 also includes user interface device(s) 147 having touch/haptic controls 148 and display 150. Display presents user interface 151. I/O subsystem 110 also includes microphone 152, range finder 153, and audio output device(s) 154. I/O subsystem 110 also includes I/O controller 155, which connects to peripheral devices external to housing 156 of communication device 100. In one or more embodiments, housing 156 has a flip form factor with movable (flip) housing 157 pivotally coupled to base housing 158. T-shaped slot antenna 102 can be incorporated into a portion of metallic frame 104 that supports one of flip and base housing 157-158.

Controller 101 controls the various functions and/or operations of communication device 100. These functions and/or operations include, but are not limited to including, application data processing, communication with other electronic devices, navigation tasks, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 101 includes processor subsystem 164, which includes one or more central processing units (CPUs), depicted as data processor 165. Processor subsystem 164 can include one or more digital signal processors 167 that are integrated with data processor 165 or are communicatively coupled to data processor 165. Data processor 165 is communicatively coupled, via system interlink 142, to device memory 166.

Device memory 166 includes applications such as communication application 168 and other application(s) 171. Device memory 166 further includes operating system (OS) 172, firmware interface (I/F) 173, such as basic input/output system (BIOS) or Uniform Extensible Firmware Interface (UEFI), and other firmware 174. Device memory 166 includes data 175 used by communication application 168 and other application(s) 171.

Processor subsystem 164 of controller 101 executes program code such as communication application 168 to provide operating functionality of communication device 100. These software and/or firmware modules have varying functionality when their corresponding program code is executed by processor subsystem 164 or secondary processing devices within communication device 100. For example, processor subsystem 164 of controller 101 can execute program code of communication application 168 to communicate via T-shaped slot antenna 102.

In one or more embodiments, controller 101 of communication device 100 is communicatively coupled via system interlink 142 to wireless communication subsystem 107, data storage subsystem 109, and input/output subsystem 110. System interlink 142 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 142) are illustrated in FIG. 1, it is to be understood that more, fewer, or different interconnections may be present in other embodiments.

Communication module 120 communicates with node(s) 129 via uplink/downlink channels 190. Communication module 120 communicates with access node 131 via transmit/receive signals 191. Communication module 120 receives satellite broadcast signals 192 from GPS satellites 128. Communication module 120 communicates with wireless headset 126 via transmit/receive signals 193. Communication module 120 communicates with smart watch 127 via transmit/receive signals 194. Within wireless communication subsystem 107, communication module 120 operates in baseband frequency range to encode data for transmission and decode received data, according to a communication protocol. Modem(s) 119 modulate baseband encoded data from communication module 120 onto a carrier signal to provide a transmit signal that is amplified by transmitter(s) 117. Modem(s) 119 demodulates the received signal from base node(s) 129 or the received signal from access node 131. The received signal is detected by antenna subsystem 112. The received signal is amplified and filtered by receiver(s) 118, which demodulate received encoded data from a received carrier signal.

In one or more embodiments, controller 101, via wireless communication subsystem 107, performs multiple types of OTA or wireless communication with external communication system 125. Wireless communication subsystem 107 can communicate via Bluetooth connection with one or more personal access network (PAN) devices, such as wireless headset 126 and smart watch 127. Communication via Bluetooth connection includes both transmission and reception via a Bluetooth transceiver device. In one or more embodiments, wireless communication subsystem 107 communicates with one or more locally networked devices via a wireless local area network (WLAN) link provided by access node 131. In one or more embodiments, access node 131 supports communication using one or more IEEE 802.11 WLAN protocols. Access node 131 is connected to wide area network 132, such as the Internet. In one or more embodiments, wireless communication subsystem 107 communicates with GPS satellites 128 to obtain geospatial location information.

T-shaped slot antenna 102 can support one or more communication frequencies. Slot antennas are radiating elements used typically at frequencies between 300 MHz and 24 GHz. A slot antenna consists of a metal surface, usually a flat plate, with one or more holes or slots cut out. When the plate is driven as an antenna by a driving frequency, the slot radiates electromagnetic waves in a way similar to a dipole antenna. T-shaped slot antenna 102 radiates a pattern that is similar to a complementary shaped dual inverted "L" antenna (DILA) dipole antenna. The T-shaped slot antenna 102 behaves according to Babinet's principle as a resonant radiator. This principle relates the radiated fields and impedance of an aperture or slot antenna to that of the field of a dipole antenna. The polarization of a slot antenna is linear. The fields of the slot antenna are almost the same as the dipole antenna, but the field's components are interchanged: a vertical slot has a horizontal electric field whereas a vertical dipole has a vertical electrical field. In one or more embodiments, portions of metallic frame 104 are removed such that the perimeter of metallic frame 104 is continuous and at the same time allows the formation of a dual slot antenna as part of metallic frame 104. Non-conductive material 196 such as a resin or polymer can be introduced into the space formed by the removed metallic material. T-shape slot antenna 102 is not cut through metallic frame 102 and does not create any discontinuities in housing 156, preserving sturdiness of communication device 100. T-shape slot antenna 102 has two arms, short arm 197a and long arm 197b allowing T-shape slot antenna 102 to be dimensionally tuned to have dual band resonance. Short and long arms 197a-197b define an outer edge of slot 198 except for gap 199 between short and long arms 197a-197b. T-shape slot antenna 102 can be fed in different ways depend on internal mechanical structure of communication device 100. In one or more embodiments discussed below, T-shape slot antenna 102 is fed through a capacitive coupled line. Since T-shape slot antenna 102 is formed in an exterior metal band of communication device 100, performance of T-shape slot antenna 102 is good in term of radiation efficiency and voltage standing wave ratio (VSWR). The parameter, VSWR, is a measure that numerically describes how well an antenna is impedance matched to the radio or transmission line that the antenna is connected to.

Figures 2, 3:
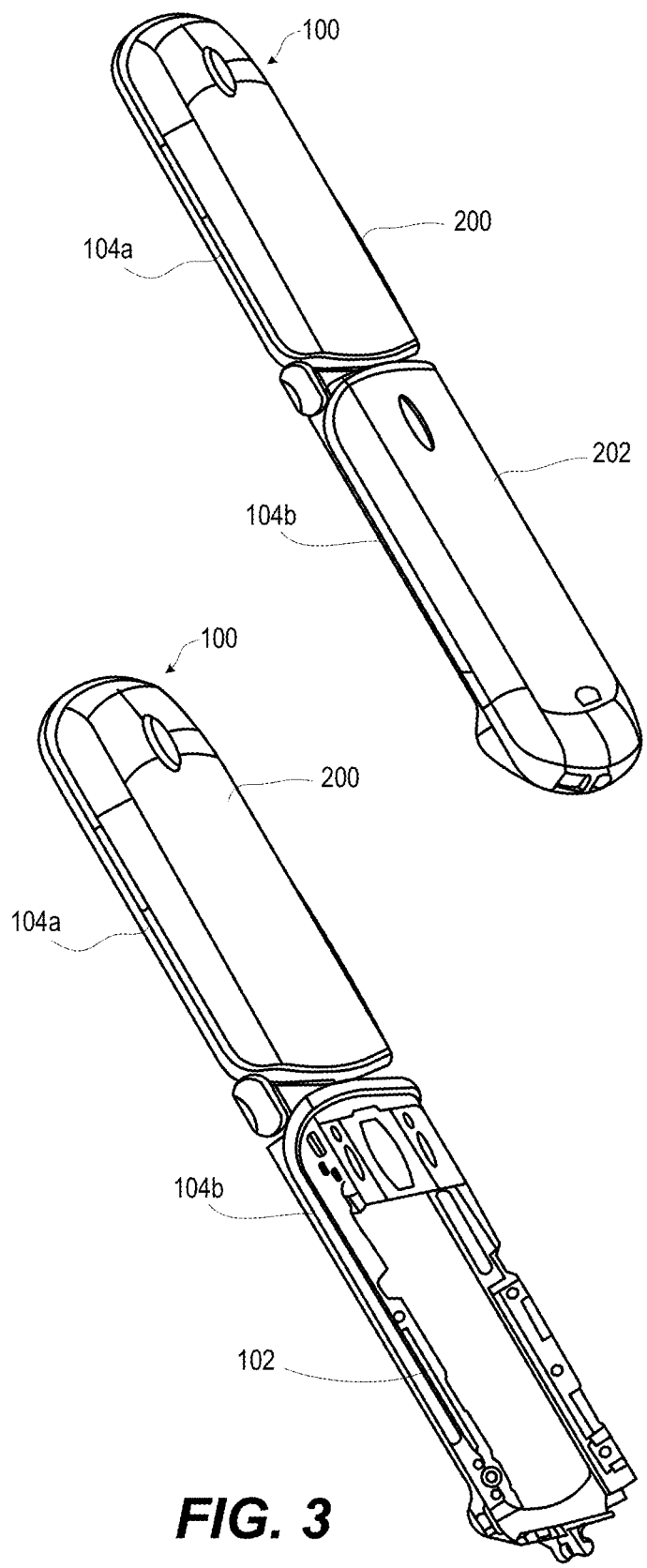
FIG. 2 illustrates a three-dimensional back view of an example communication device of FIG. 1 in an open position, according to one or more embodiments.
FIG. 3 illustrates a three-dimensional back view of the example communication device of FIG. 2 in the open position and partially disassembled to depict a T-shaped slot antenna incorporated into a metallic frame, according to one or more embodiments.
Figure 4:
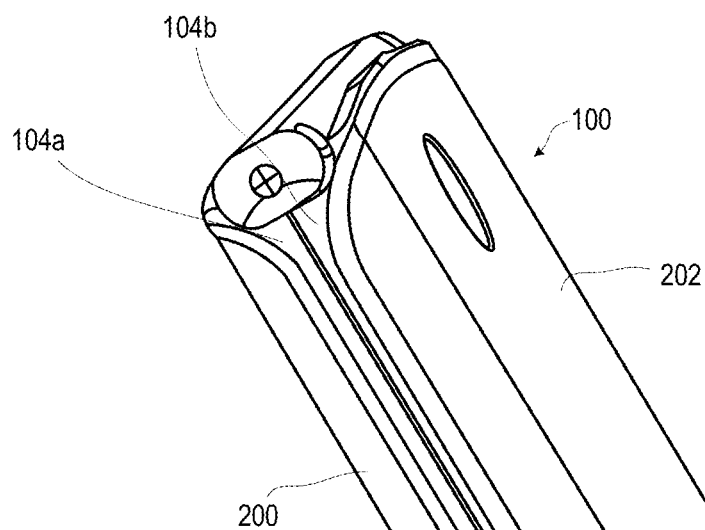
FIG. 4 illustrates a three-dimensional back view of the example communication device of FIG. 2 in a closed position, according to one or more embodiments.
Figure 5:
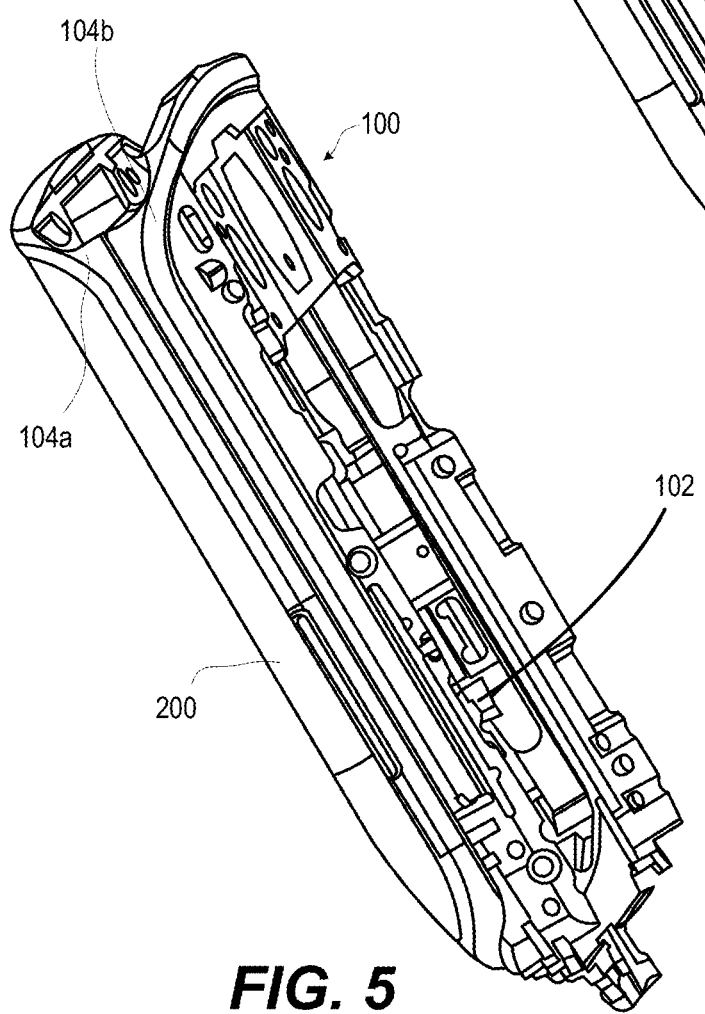
FIG. 5 illustrates a three-dimensional back view of the example communication device of FIG. 2 in the closed position and partially disassembled to depict a T-shaped slot antenna incorporated into a metallic frame, according to one or more embodiments.

FIGS. 2-5 depict several view of example communication device 100. FIG. 2 depicts a three-dimensional back view of example communication device 100 in an open position. Communication device 100 is a portable electronic device having two metallic frames, flip and base metallic frames 104a-104b, which are pivotally coupled to form a flip form factor. Flip cover 200 is attached over a back portion of flip metallic frame 104a. Base cover 202 is attached over a back portion of base metallic frame 104b. Flip and base covers 200-202 are electromagnetically transparent to RF and microwave radiated signals. FIG. 3 depicts a three-dimensional back view of example communication device 100 of FIG. 2 in the open ("unfolded") position. In FIG. 3, base cover 202 (FIG. 2) is removed. T-shaped slot antenna 102 is incorporated into base metallic frame 104b. The orientation of T-shaped slot antenna 102 is illustrative with other placements and orientations being consistent with aspects of the present disclosure. In one or more embodiments, T-shaped slot antenna 102 is oriented with gap 199 directed toward a back side of communication device 100 as depicted. In one or more embodiments, T-shaped slot antenna 102 is in reverse orientation, with gap 199 directed toward a front side of communication device 100. In one or more embodiments, T-shaped slot antenna 102 is rotated 90° about a longitudinal axis such that gap 199 is directed inwardly. In one or more embodiments, T-shaped slot antenna 102 is rotated −90° about the longitudinal axis such that gap 199 is directed outwardly. FIG. 4 depicts a three-dimensional view of example communication device 100 of FIG. 2 in a closed ("folded") position. FIG. 5 depicts a three-dimensional view of example communication device 100 of FIG. 4 in the closed position with base cover 202 (FIG. 2) removed. In both open positions of FIGS. 2-3 and closed positions of FIGS. 4-5, T-shape slot antenna 102 is electromagnetically exposed to at least a 180° hemispheric area from a lateral side of example communication device 100.

Figure 6:
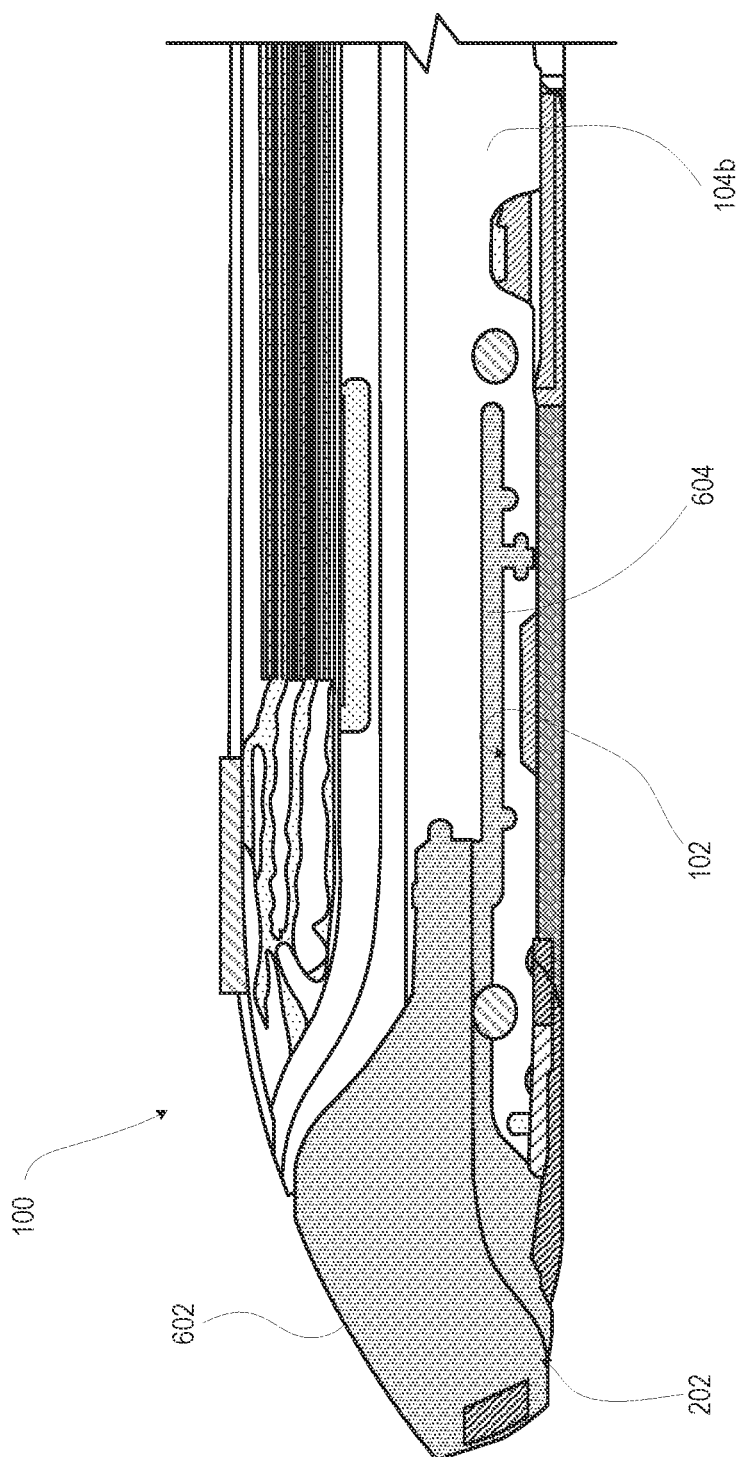
FIG. 6 illustrates a detailed three-dimensional side view of the example communication device of the example communication device of FIG. 2 in a closed position, according to one or more embodiments.

FIG. 6 depicts a detailed three-dimensional side view of example communication device 100 in a closed position. T-shaped slot antenna 102 is formed in base metallic frame 104b. In one or more embodiments, base metallic frame 104b is aluminum. Base cover 202 includes a plastic molded nose portion 602 that distally extends from base metallic frame 104b. Base cover 202 includes plastic fill portions 604 that close openings in base metallic frame 104b, such as T-shape slot antenna 102. White portions of FIG. 6 depict the aluminum metallic frame and yellow portions of FIG. 6 depict plastic.

Figure 7A:
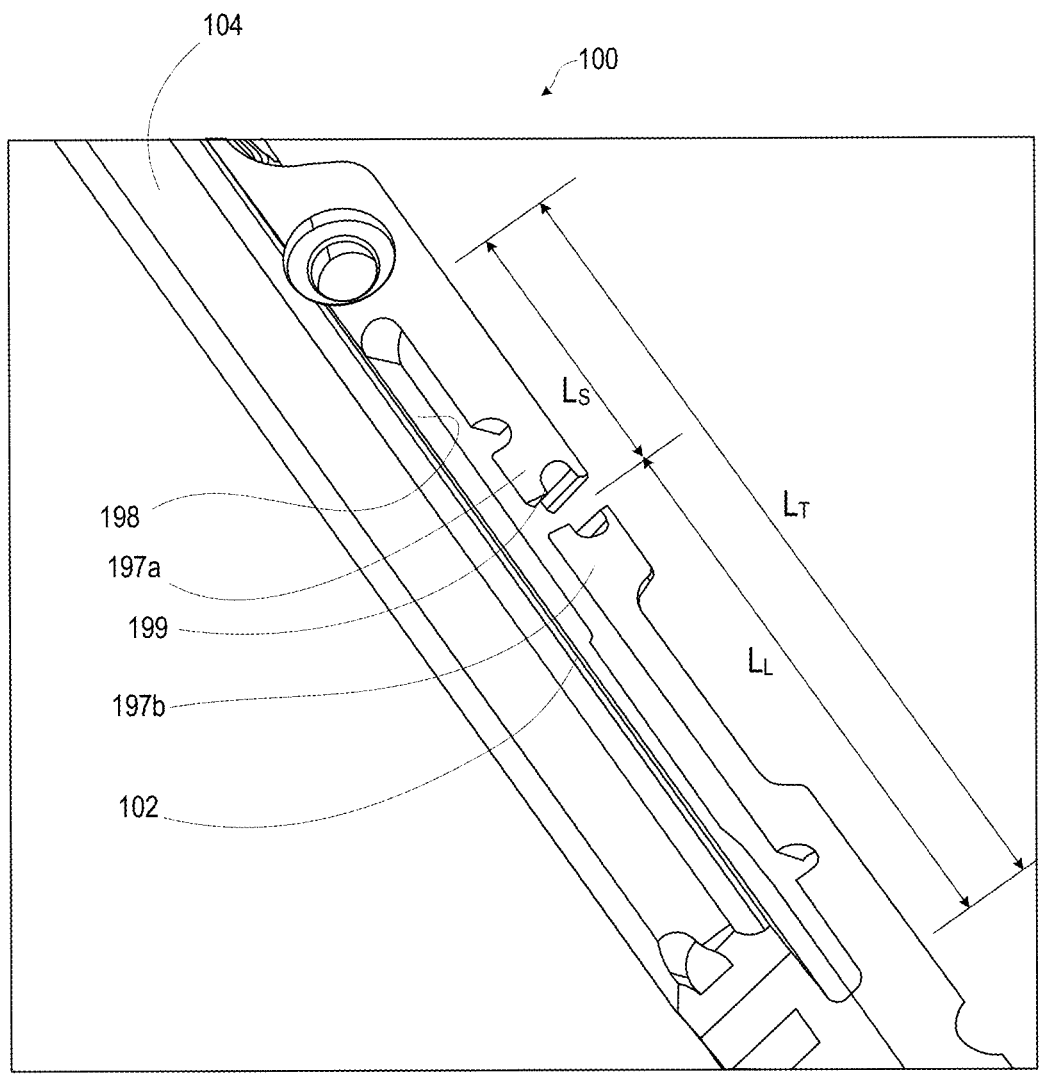
FIG. 7A illustrates a three-dimensional side view of the T-shaped slot antenna incorporated into a metallic frame of the communication device of FIG. 5, according to one or more embodiments.

FIG. 7A depicts a three-dimensional side view of the T-shaped slot antenna incorporated into a metallic frame of FIG. 5. Short arm 197a has length $L_S$. Long arm 197b has length $L_L$. Total length of T-shape slot antenna 102 is $L_T=L_S+L_L$. Differential length $\Delta L$ of T-shape slot antenna 102 is $\Delta L=L_L-L_S$. These lengths correspond to harmonic multiples ¼, ½, 1, etc. of a wavelength (λ) of an excitation signal with appropriate placement of antenna feed that produce resonant frequencies. Short arm 197a is responsible for a higher resonance frequency than long arm 197b of T-shaped slot antenna 102. With excitation near the middle of T-shape slot antenna 102, a differential mode resonance can be excited.

Figure 7B:
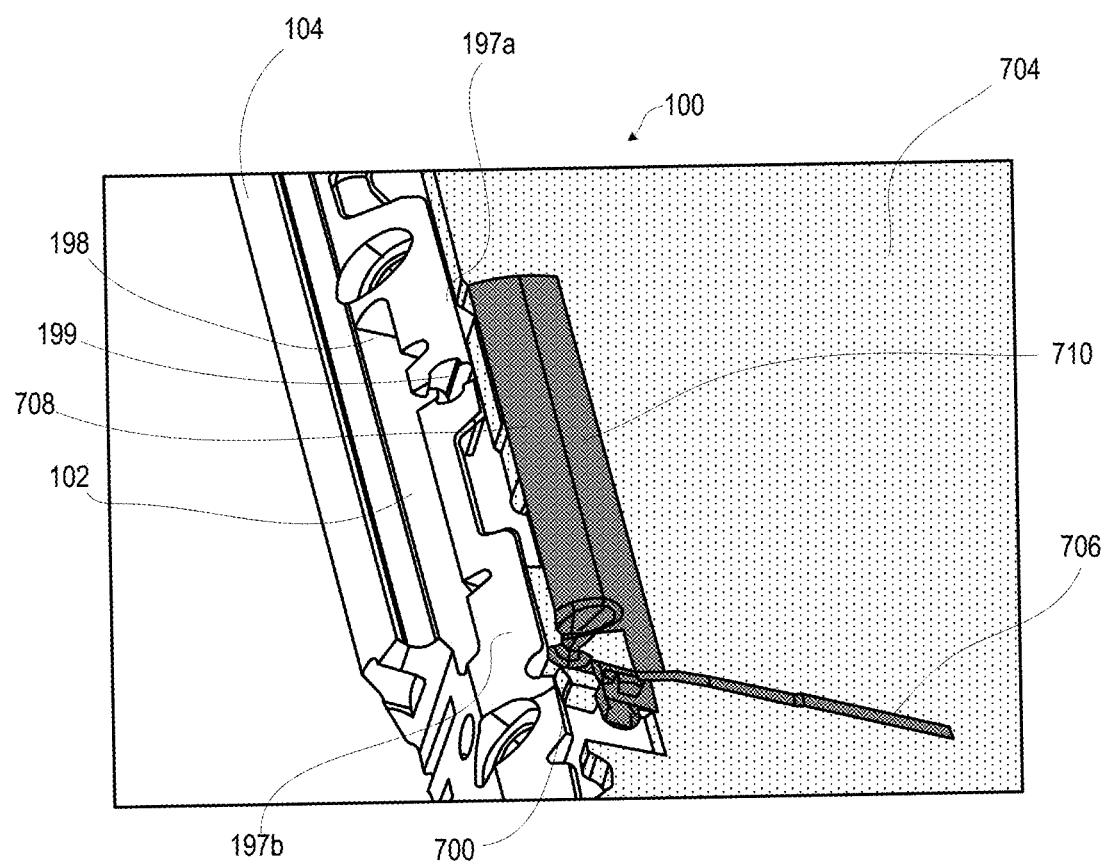
FIG. 7B illustrates a three-dimensional top view of the T-shaped slot antenna of FIG. 5 and an antenna feed depicted disassembled from an edge of a printed circuit board (PCB) of the communication device, according to one or more embodiments.

FIG. 7B depicts a three-dimensional top view of T-shaped slot antenna 102 of FIG. 5 and an antenna feed 700 depicted as disassembled from an edge of printed circuit board (PCB) 704 that is disposed within metallic frame 104. A conducting trace 706 is electrically connected to capacitive plate 708, which is introduced in proximity to slot 198 in order to excite T-shape slot antenna 102 at the edge. Plate support 710 is attached to capacitive plate 708 and PCB 704. When assembled, capacitive plate 708 extends into slot 198 in close proximity to short and long arms 197a-197b. Good radiation efficiency is achieved for reasons that include: (a) T-shape slot antenna 102 is exposed to the outside of communication device 100; (b) positioning of T-shape slot antenna 102 provides more than 180° of exposure; and (c) placement of PCB 704 exactly under T-shape slot antenna 102 avoids any image current.

Figure 8:
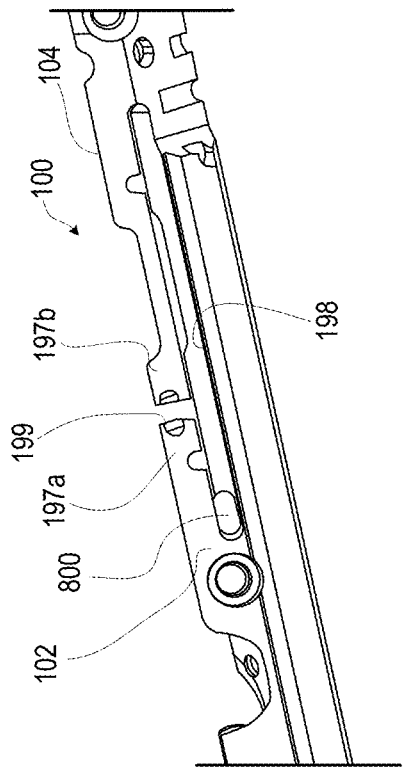
FIG. 8 illustrates a side view of the T-shaped slot antenna of FIG. 5 with an ideal feed in a short arm portion of the T-shaped slot, according to one or more embodiments.
Figure 9:
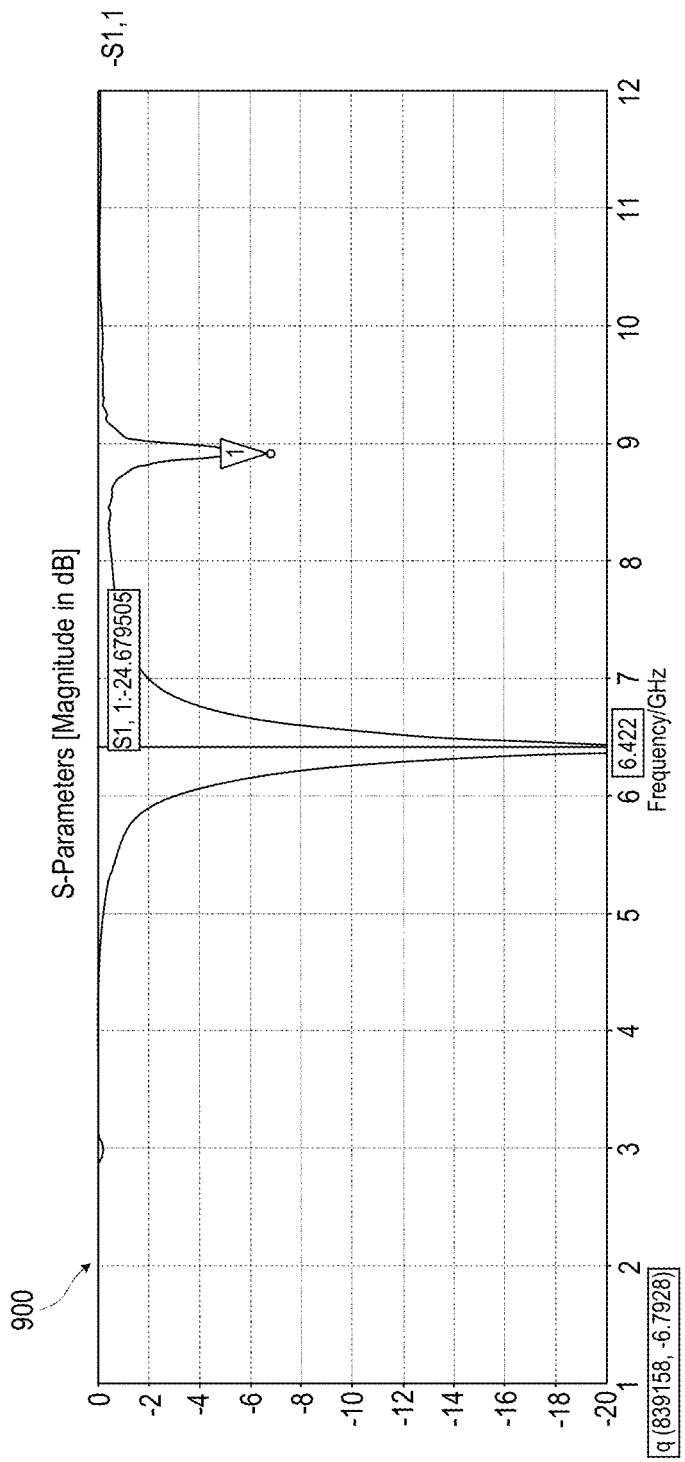
FIG. 9 is a graphical plot illustrating the magnitude of scatter parameters as a function of frequency of the T-shaped slot antenna of FIG. 8, according to one or more embodiments.

FIG. 8 depicts a side view of the T-shaped slot antenna 102 of FIG. 5 with an ideal feed 800 in short arm end 802 of slot 198, opposite to long arm end 804 of slot 198. Ideal feed 800 is a direct RF or microwave connection to a particular point proximate to slot 198 that corresponds to harmonic nodes. According to the illustrative embodiments, the housing system has multiple inserted molded elements, which are part of the overall structure. In one or more embodiments, nonconductive material fills openings in frame 104, such as slot 198. Nonconductive material can also cover portions of frame 104, such as base cover 202 (FIG. 2). Considering the nonconductive material that is molded to fill T-shaped slot 102, resonance frequency of short arm 197a has quarter wavelength (λ/4) at 6.4 GHz. FIG. 9 depicts a graphical plot 900 of the magnitude in decibels (dB) of scatter parameters as a function of frequency of T-shaped slot antenna 102 of FIG. 8. Scattering parameters ("S-parameters") describe the electrical behavior of linear electrical networks when undergoing various steady state stimuli by electrical signals. The nonconductive material has permittivity that is more than air and affects the resonance frequency of T-shaped slot antenna 102, shifting the resonance frequency down in relation to a value of permittivity of the material. Graphical plot 900 confirms the resonant frequency behavior of quarter wavelength (λ/4) at 6.4 GHz.

Figure 10:
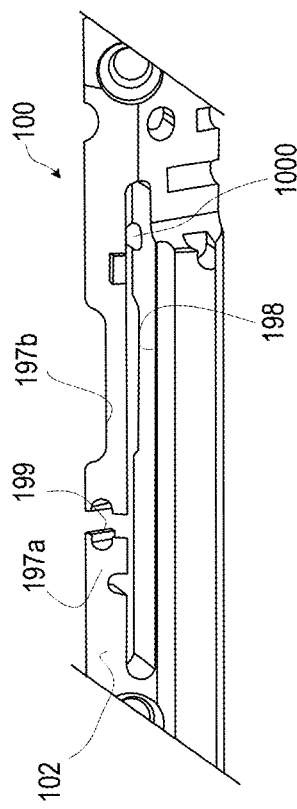
FIG. 10 illustrates a side view of the T-shaped slot antenna of FIG. 5 with an ideal feed in a long arm portion of the T-shaped slot, according to one or more embodiments.
Figure 11:
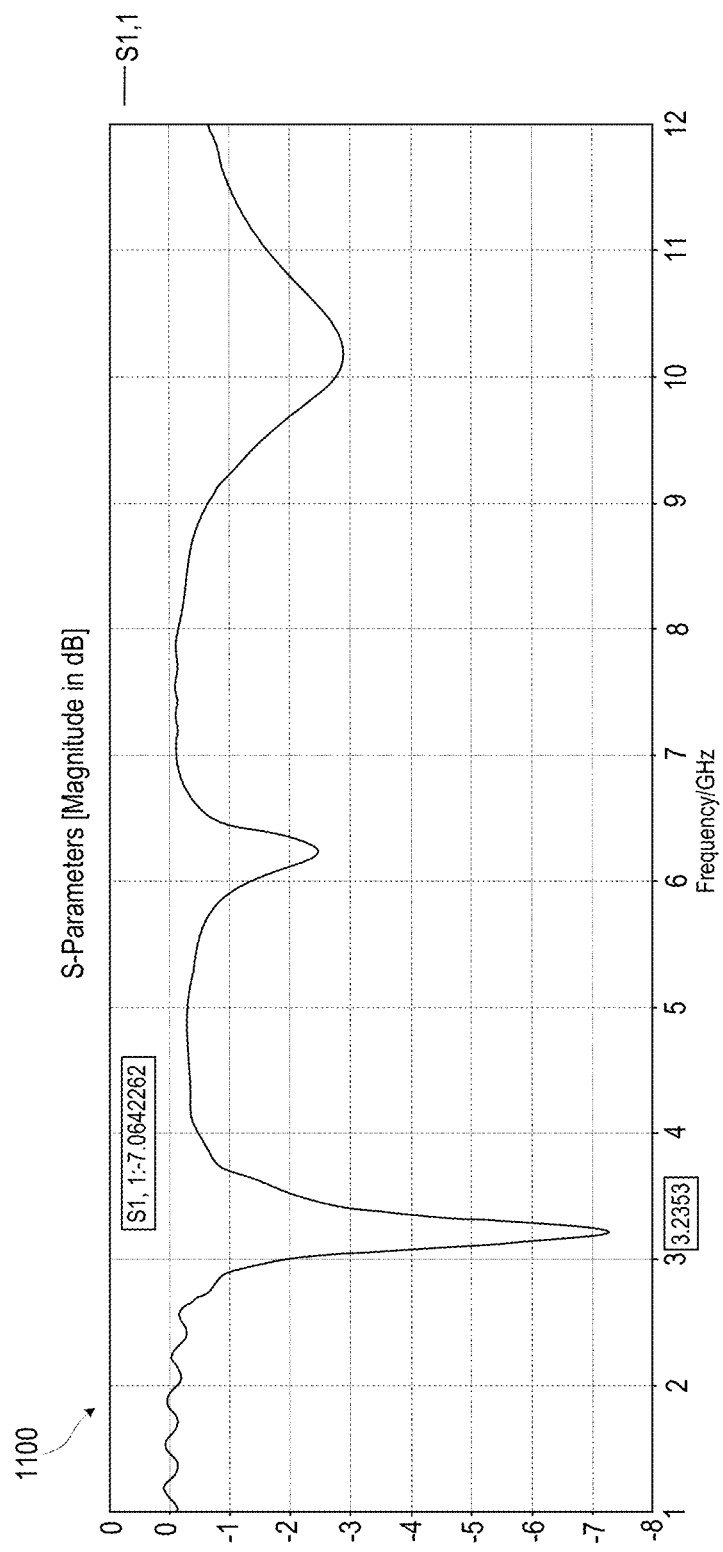
FIG. 11 is a graphical plot illustrating the magnitude of scatter parameters as a function of frequency of the T-shaped slot antenna of FIG. 10, according to one or more embodiments.

FIG. 10 depicts a side view of the T-shaped slot antenna 102 of FIG. 5 with ideal feed 1000 in a long arm portion of the T-shaped slot 198. Resonance frequency of long arm 197b has quarter wavelength (λ/4) at 3.2 GHz. FIG. 11 depicts a graphical plot 1100 of magnitude of S-parameters as a function of frequency of T-shaped slot antenna 102 of FIG. 8. Graphical plot 1100 confirms the resonant frequency behavior of quarter wavelength (λ/4) at 3.2 GHz.

Figure 12:
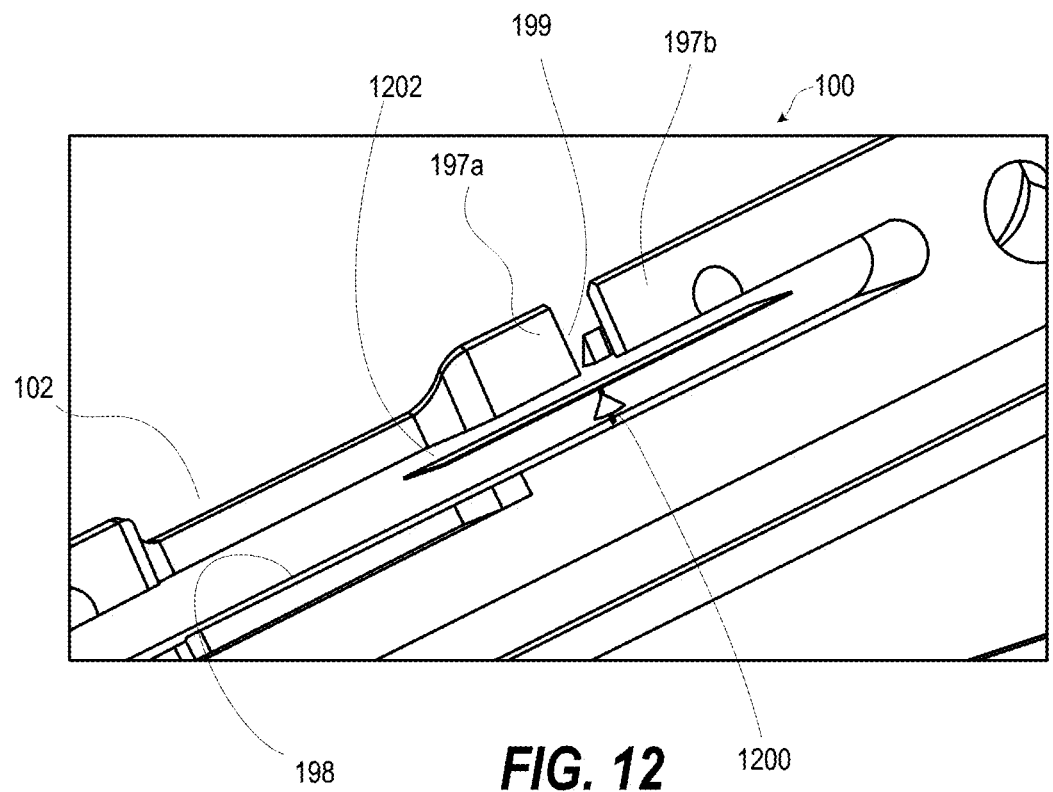
FIG. 12 is a side view of the T-shaped slot antenna of FIG. 5 with an example capacitive antenna feed coupled to elongated capacitive plate positioned in close proximity to adjacent portions of both arms, according to one or more embodiments.

FIG. 12 depicts a side view of T-shaped slot antenna 102 of FIG. 5 with an example elongated capacitive antenna feed 1200 coupled to capacitive plate 1202 that is positioned in close proximity to adjacent portions of both arms 197a-197b within slot 198. Resonance frequency can be tuned by designing capacitive plate 1202. In particular, dimensions of capacitive plate 1202 and a distance of capacitive plate 1202 from each side of slot 198 can be selected to achieve the tuning.

Figure 13:
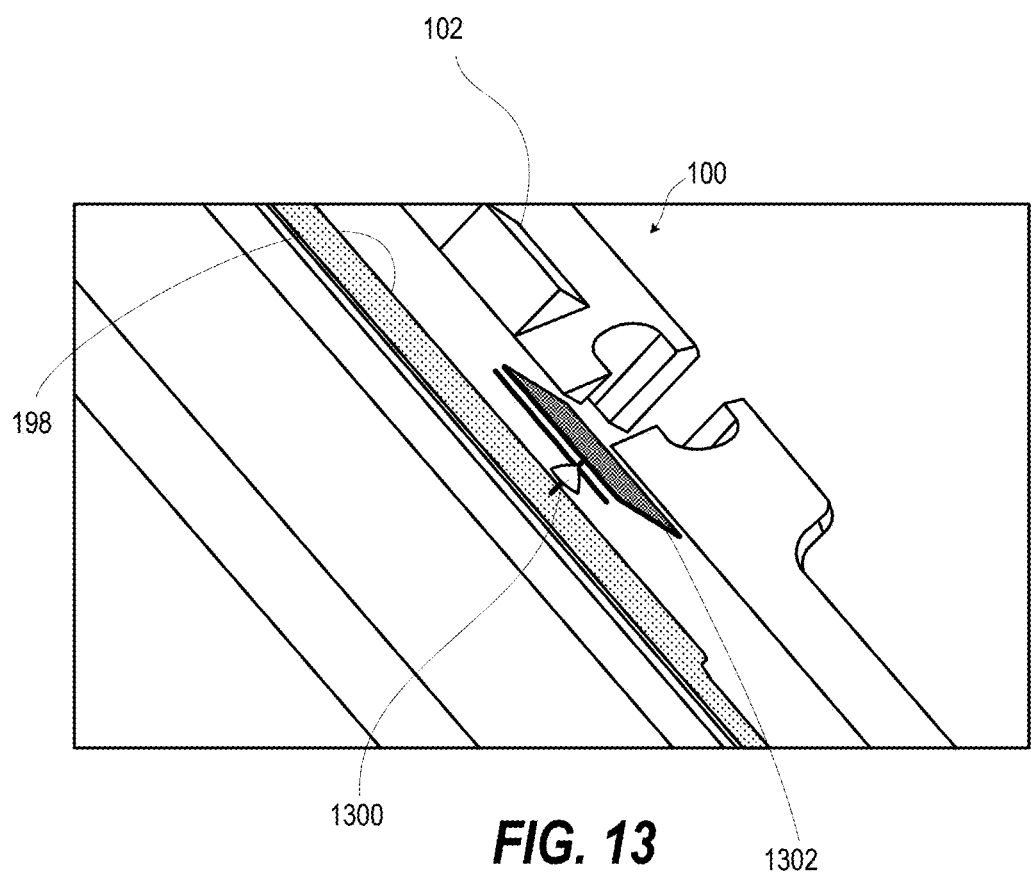
FIG. 13 is a three-dimensional side view of the T-shaped slot antenna of FIG. 5 and an example capacitive antenna feed coupled to narrow capacitive plate positioned in close proximity to adjacent portions of both arms, according to one or more embodiments.
Figure 14:
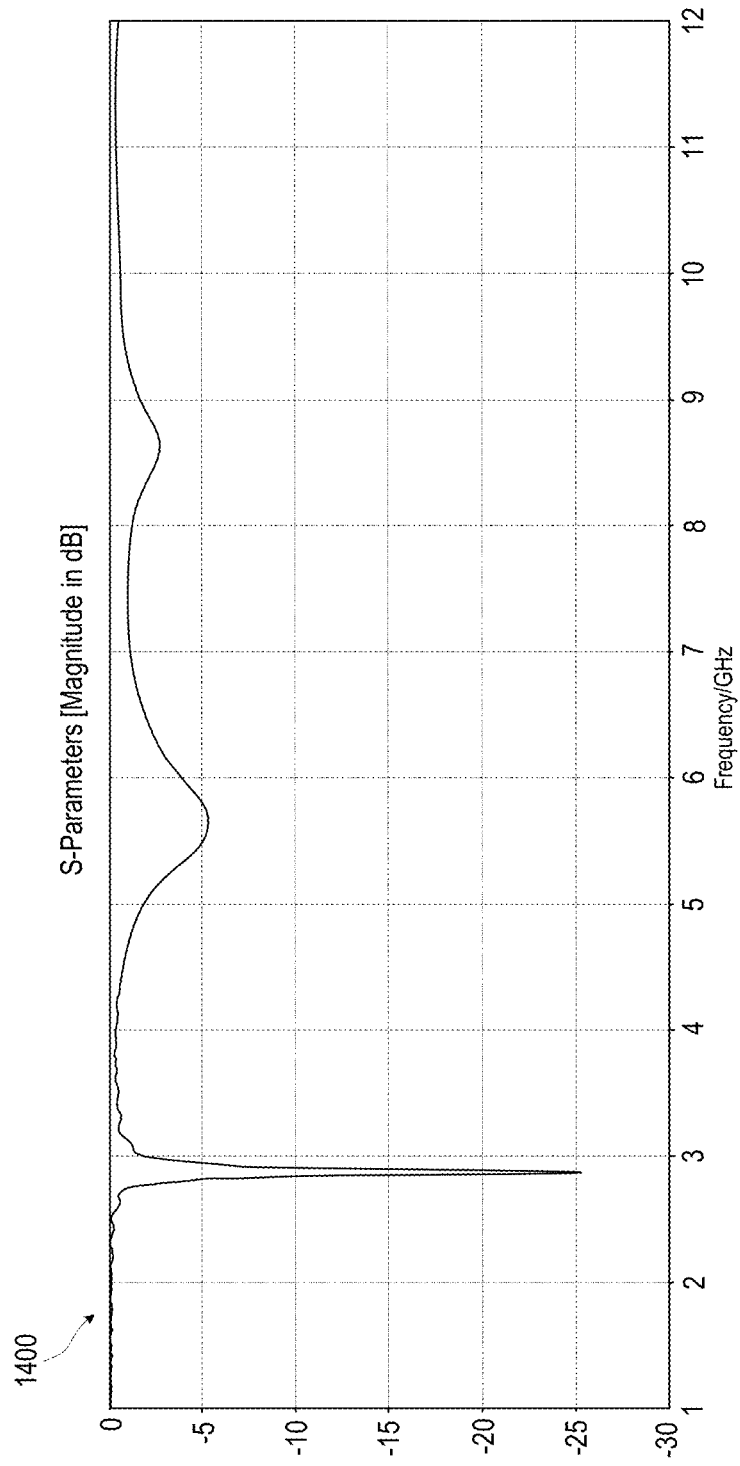
FIG. 14 is a graphical plot illustrating the magnitude of scatter parameters as a function of frequency of the T-shaped slot antenna of FIG. 13, according to one or more embodiments.

FIG. 13 depicts a three-dimensional side view of T-shaped slot antenna 102 of FIG. 5 having example capacitive antenna feed 1300 coupled to narrow capacitive plate 1302 of longitudinal dimension 2.6 mm positioned within slot 198 in close proximity to adjacent portions of both arms 197a-197b. FIG. 14 depicts a graphical plot 1400 of the magnitude of scatter parameters as a function of frequency of T-shaped slot antenna 102 of FIG. 13. Graphical plot 1400 confirms that a resonant frequency is achieved with narrow capacitive plate 1302.

Figure 15:
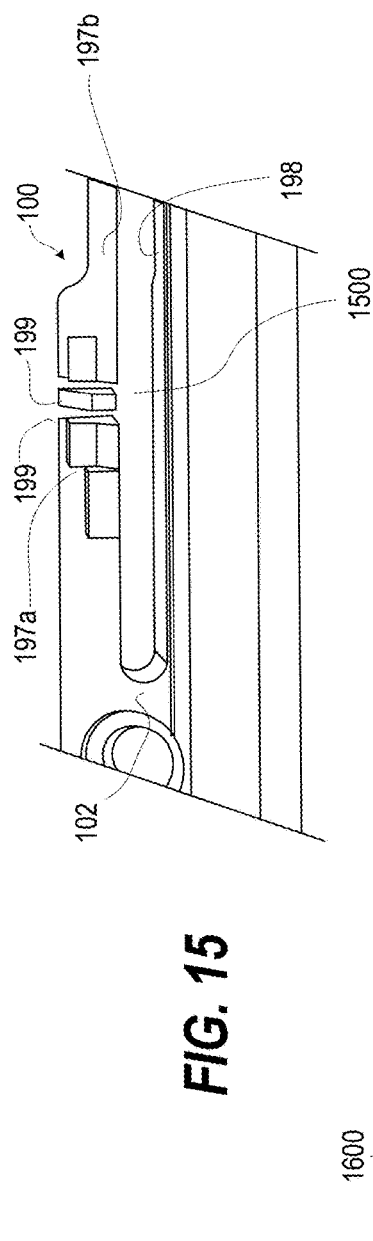
FIG. 15 is a side view of the T-shaped slot antenna of FIG. 5 and an example capacitive antenna feed coupled to small capacitive plate positioned in a gap between both arms, according to one or more embodiments.
Figure 16:
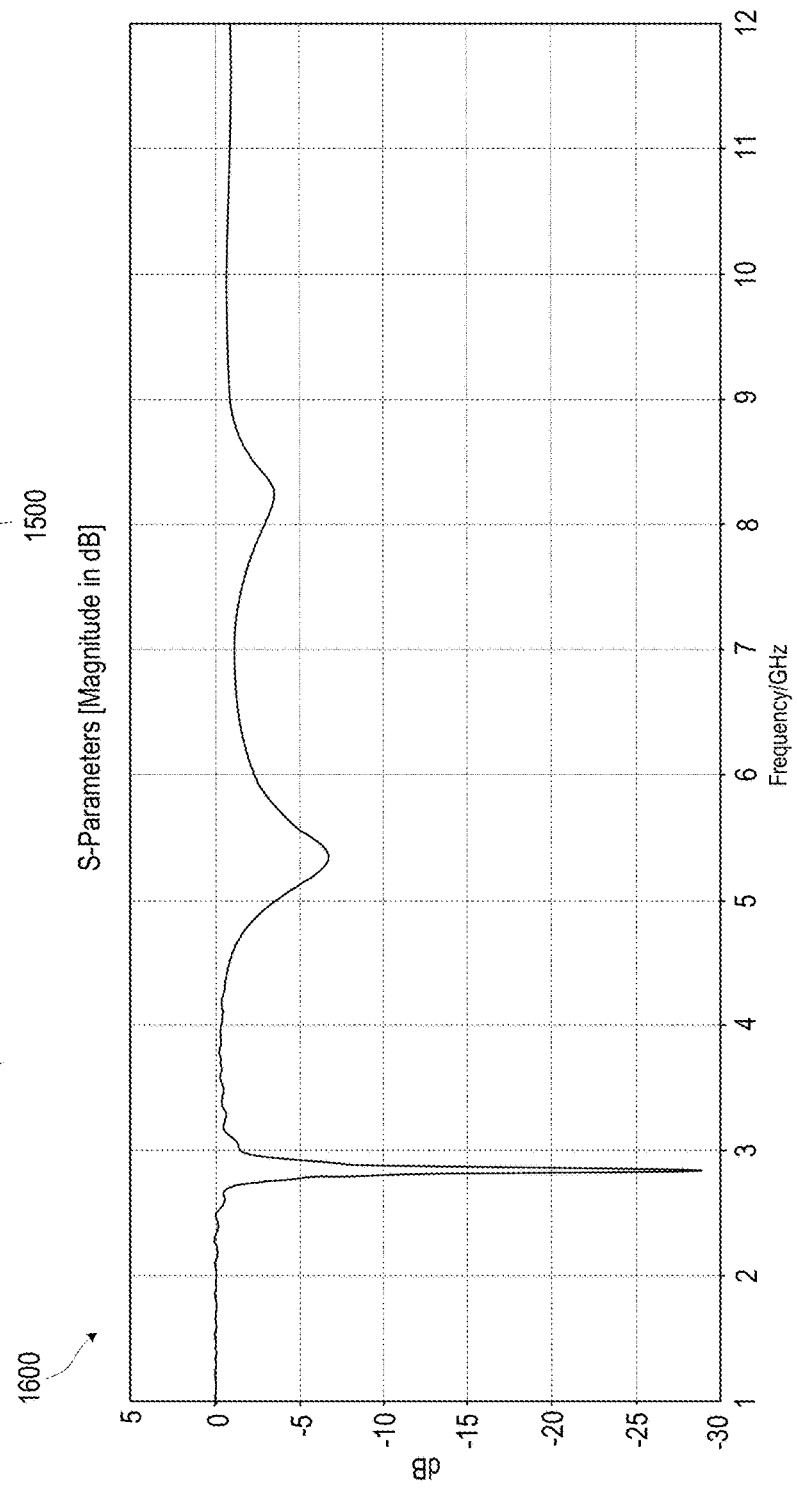
FIG. 16 is a graphical plot illustrating the magnitude of scatter parameters as a function of frequency of the T-shaped slot antenna of FIG. 15, according to one or more embodiments.

FIG. 15 depicts a side view of T-shaped slot antenna 102 of FIG. 5 with example capacitive antenna feed 1500 coupled to capacitive plate 1502 positioned in gap 199 between both arms 197a-197b. FIG. 16 depicts a graphical plot 1600 of the magnitude of scatter parameters as a function of frequency of the T-shaped slot antenna of FIG. 15. Graphical plot 1500 confirms that a resonant frequency is achieved with capacitive plate 1502.

Figure 19:
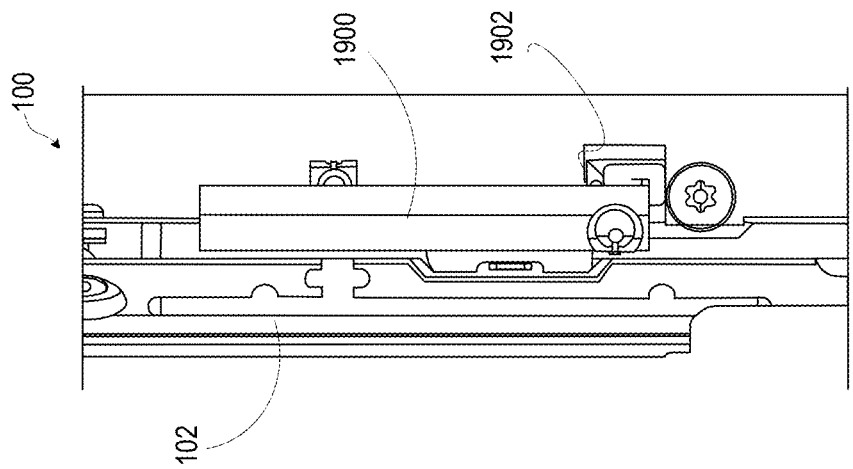
FIG. 19 illustrates a top view of the T-shaped slot antenna of FIG. 5 and a third example capacitive antenna coupling and line feed extending to a position further inside of the terminating end of the long arm portion of the T-shaped slot, according to one or more embodiments.
Figure 18:
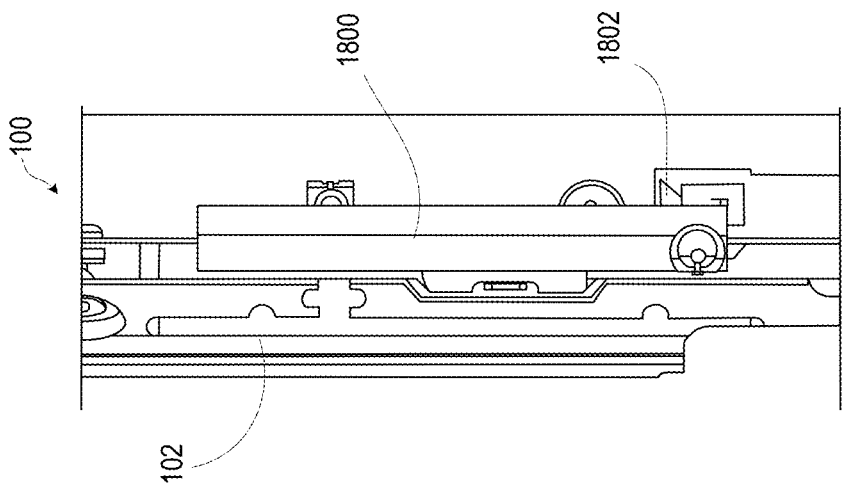
FIG. 18 illustrates a top view of the T-shaped slot antenna of FIG. 5 and a second example capacitive antenna coupling and line feed extending to a position inside of the terminating end of the long arm portion of the T-shaped slot, according to one or more embodiments.
Figure 17:
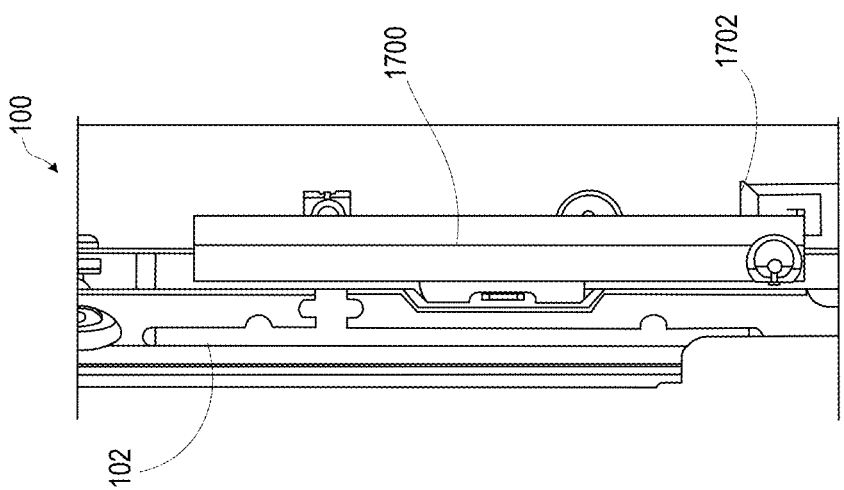
FIG. 17 illustrates a top view of the T-shaped slot antenna of FIG. 5 and a first example capacitive antenna coupling and line feed extending to a terminating end of a long arm portion of the T-shaped slot, according to one or more embodiments.
Figure 20:
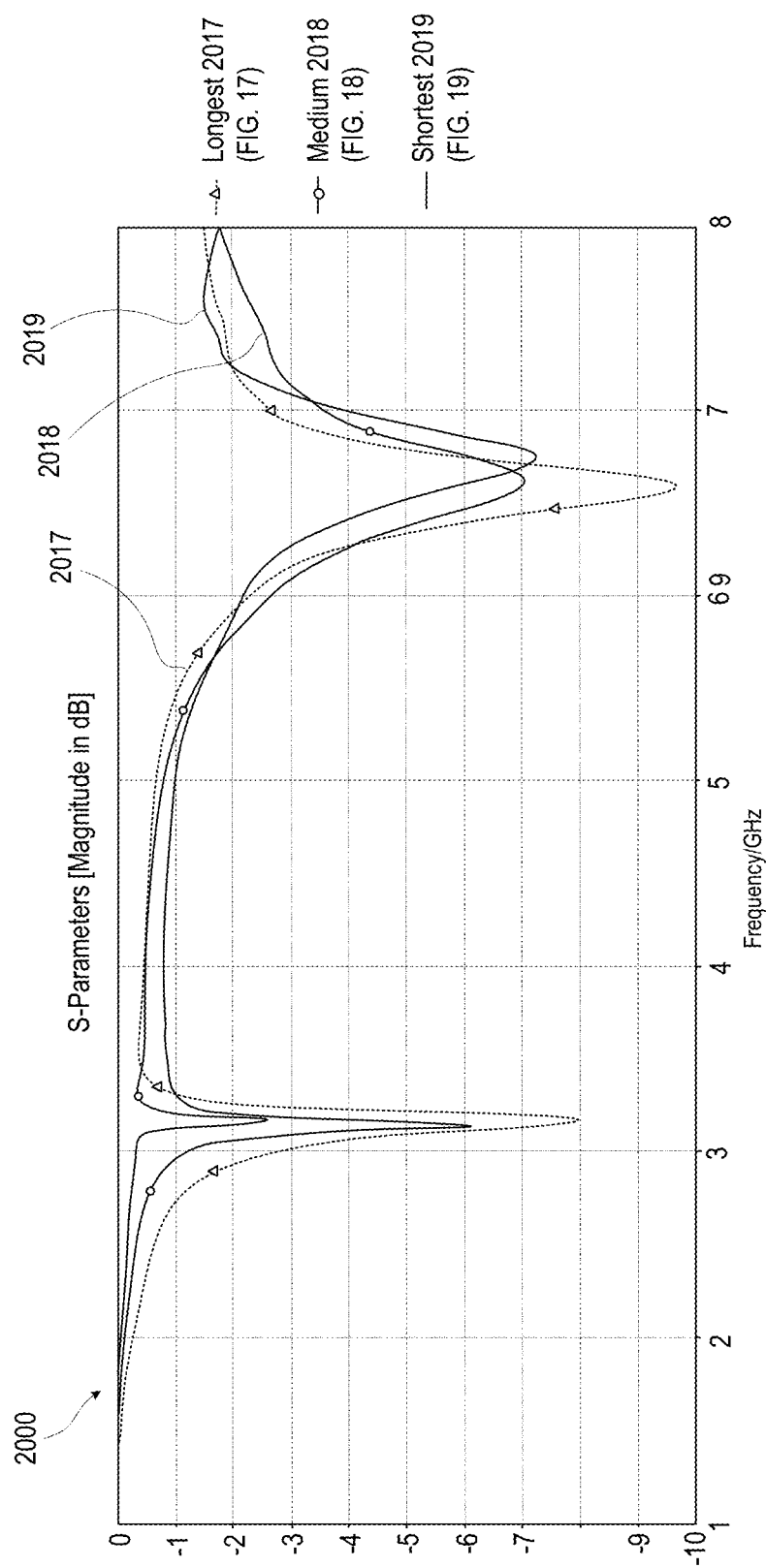
FIG. 20 is a graphical plot illustrating the magnitude of scatter parameters as a function of frequency of the T-shaped slot antenna of FIGS. 17-19, according to one or more embodiments.

In FIGS. 17-20, a comparative experiment was conducted, utilizing varying lengths of capacitive antenna coupling and different, relative position of line feed. FIG. 17 depicts a top view of communication device 100 having the T-shaped slot antenna 102 of FIG. 5 depicted disassembled from PCB 704. Communication device 100 includes first example capacitive antenna coupling 1700 and line feed 1702 extending to terminating end of long arm portion of the T-shaped slot 198. FIG. 18 depicts a top view of communication device 100 having T-shaped slot antenna 102 of FIG. 5 depicted disassembled from PCB 704. Communication device 100 includes second example capacitive antenna coupling 1800 and line feed 1802 extending to a position inside of the terminating end of the long arm portion of the T-shaped slot 198. FIG. 19 depicts a top view of communication device 100 having T-shaped slot antenna 102 of FIG. 5 depicted disassembled from PCB 704. Communication device 100 includes third example capacitive antenna coupling 1900 and line feed 1902 extending to a position further inside of the long arm end 804 of the slot 198. FIG. 20 depicts graphical plot 2000 of the magnitude of scatter parameters as a function of frequency of T-shaped slot antennas 102 of FIGS. 17-19. In this experiment, the effective coupling area for small arm 197a is the same at all cases, first, second and third, respectively. Specifically, trace 2017 corresponds to first example capacitive antenna coupling 1700 and line feed 1702 of FIG. 17. Trace 2018 corresponds to second example capacitive antenna coupling 1800 and line feed 1802 of FIG. 18. Trace 2019 corresponds to second example capacitive antenna coupling 1900 and line feed 1902 of FIG. 19. By changing the location of line feed 1702 (FIG. 17), 1802 (FIG. 18), 1902 (FIG. 19), the length of corresponding capacitive antenna coupler 1700 (FIG. 17), 1800 (FIG. 18), 1900 (FIG. 19) also changed. Traces 2017, 2018, and 2019 indicate that resonance does not depend on the longitudinal length of the coupler line, but rather depends on how good coupling is done at smaller arm 197a. Changes in higher resonance frequencies are not expected in the first, second, and third cases respectively of FIGS. 17-19. The effective coupling area for long arm 804 changes in FIG. 17-19, getting smaller respectively. For the shortest length of coupling feed (FIG. 19), trace 2019 does have very good resonance at lower frequency (3.1 GHz). The reason is that long arm 804 of T-shaped slot 198 (FIG. 19) is responsible for lower resonance. With a short feed, the coupling with long arm 804 of T-shaped slot 198 decreased. The portion of slot 198 adjacent to long arm 804 (FIG. 19) is not fed well.

Figure 21:
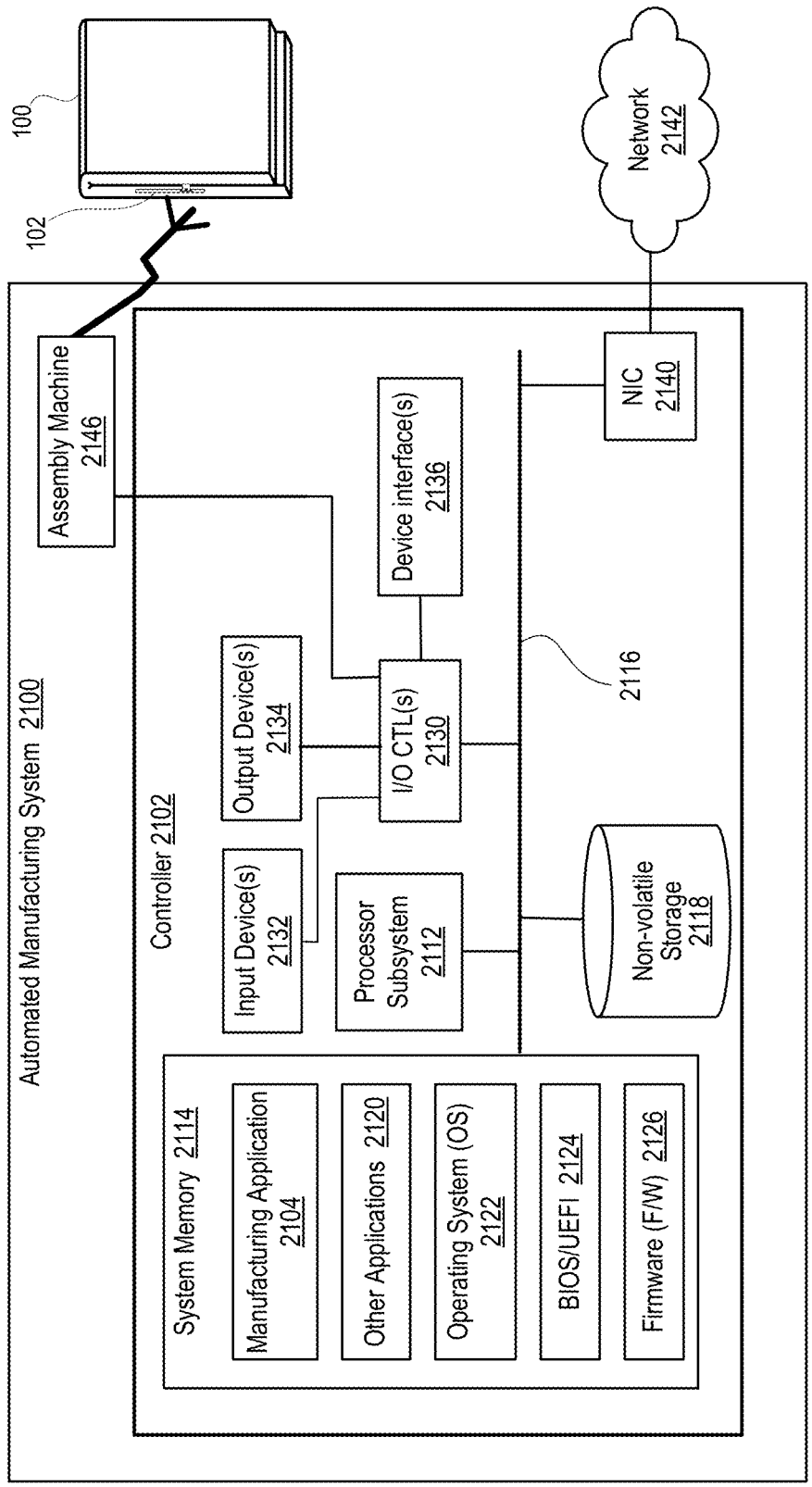
FIG. 21 illustrates a functional block diagram of a manufacturing system, according to one or more embodiments.

FIG. 21 illustrates a block diagram representation of automated manufacturing system (AMS) 2100 that manufactures and assembles communication devices 100 having T-shaped slot antennas 102. Controller 2102 of automated manufacturing system 2100 executes manufacturing application 2104 that controls assembly machine(s) 2106. Assembly machine(s) 2106 fabricate, treat, handle, and assemble the communication devices 100. Controller 2202 has processor subsystem 2112 that is coupled to system memory 2114 via system interconnect 2116. System interconnect 2116 can be interchangeably referred to as a system bus, in one or more embodiments. Also coupled to system interconnect 2116 is non-volatile storage (e.g., a non-volatile random access memory (NVRAM) storage 2118, within which can be stored one or more software and/or firmware modules and one or more sets of data that can be utilized during operations of controller 2100. These one or more software and/or firmware modules can be loaded into system memory 2114 during operation of AMS 2100. Specifically, in one embodiment, system memory 2114 can include therein a plurality of such modules, including one or more of application(s) 2120, OS 2122, BIOS or UEFI 2124, and firmware 2126. These software and/or firmware modules have varying functionality when their corresponding program code is executed by processor subsystem 2112 or secondary processing devices within AMS 2100. For example, manufacturing application 2104 and other application(s) 2120 can perform machine control.

AMS 2100 further includes one or more input/output (I/O) controllers 2130 which support connection by and processing of signals from one or more connected input device/s 2132, such as a keyboard, mouse, touch screen, or microphone. I/O controllers 2130 also support connection to and forwarding of output signals to one or more connected output devices 2134, such as a monitor or display device or audio speaker(s). Additionally, in one or more embodiments, one or more device interfaces 2136, such as an optical reader, a USB, a card reader, Personal Computer Memory Card International Association (PCMCIA) slot, and/or a high-definition multimedia interface (HDMI), can be associated with AMS 2100. Device interface(s) 2136 can be utilized to enable data to be read from or stored to corresponding removable storage device(s) 2138, such as a compact disk (CD), digital video disk (DVD), flash drive, or flash memory card. In one or more embodiments, device interface(s) 2136 can further include general purpose I/O interfaces such as inter-integrated circuit ($I^2C$), system management bus (SMB), and peripheral component interconnect (PCI) buses.

AMS 2100 comprises a network interface controller (NIC) 2140. NIC 2140 enables AMS 2100 and/or components within AMS 2100 to communicate and/or interface with other devices, services, and components that are located external to AMS 2100. These devices, services, and components can interface with AMS 2100 via an external network, such as example network 2142, using one or more communication protocols that include transport control protocol/internet protocol (TCP/IP) and network block device (NBD) protocol. Network 2142 can be a local area network, wide area network, personal area network, and the like, and the connection to and/or between network and AMS 2100 can be wired, wireless, or a combination thereof. For purposes of discussion, network 2142 is indicated as a single collective component for simplicity. However, it should be appreciated that network 2142 can comprise one or more direct connections to other devices as well as a more complex set of interconnections as can exist within a wide area network, such as the Internet.

Figure 22A:
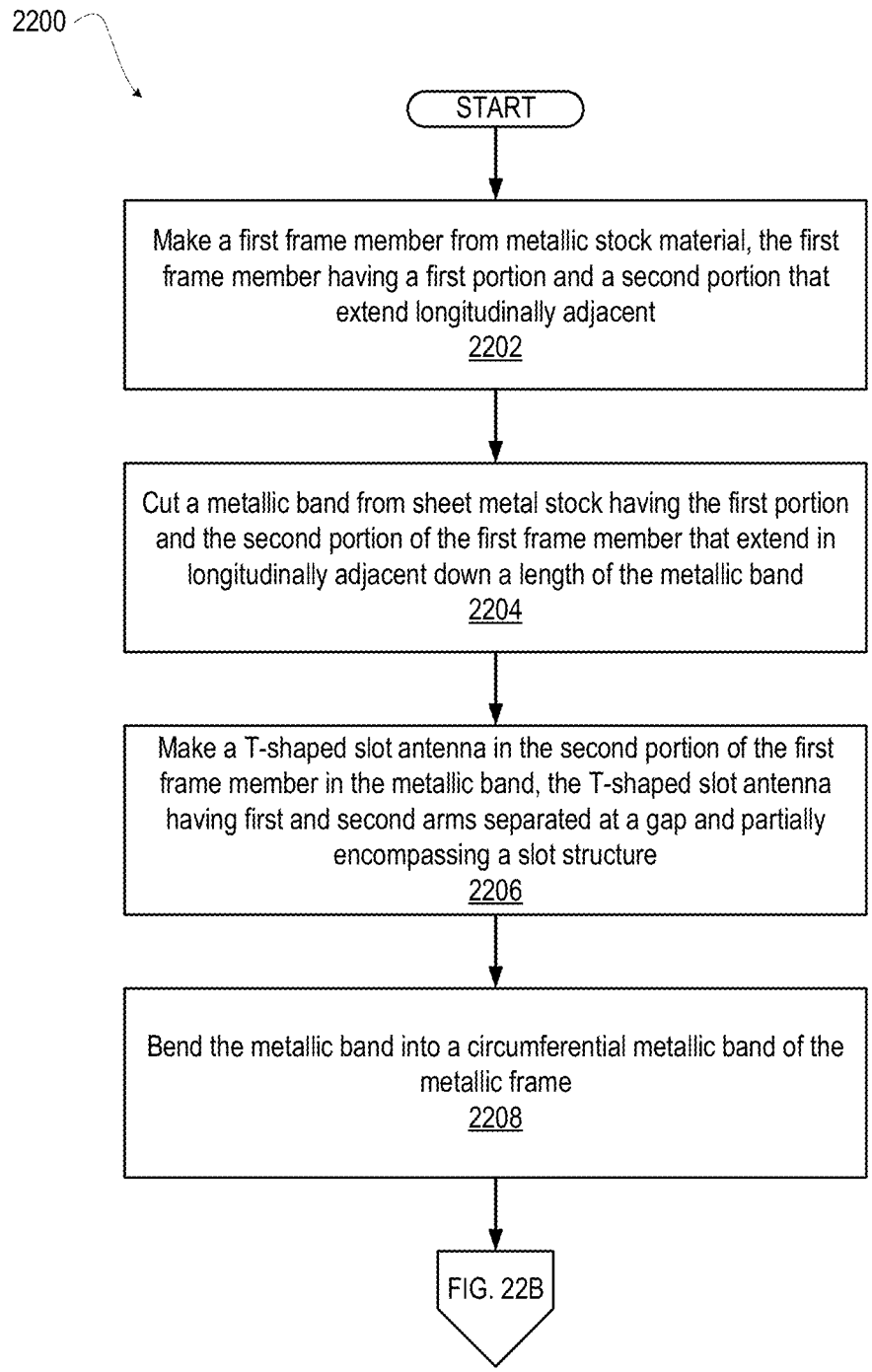
FIGS. 22A and 22B (FIG. 22) provide a flow diagram of a method for making a T-shaped slot antenna in a metallic frame of a communication device that is designed to resist twisting and bending, according to one or more embodiments.
Figure 22B:
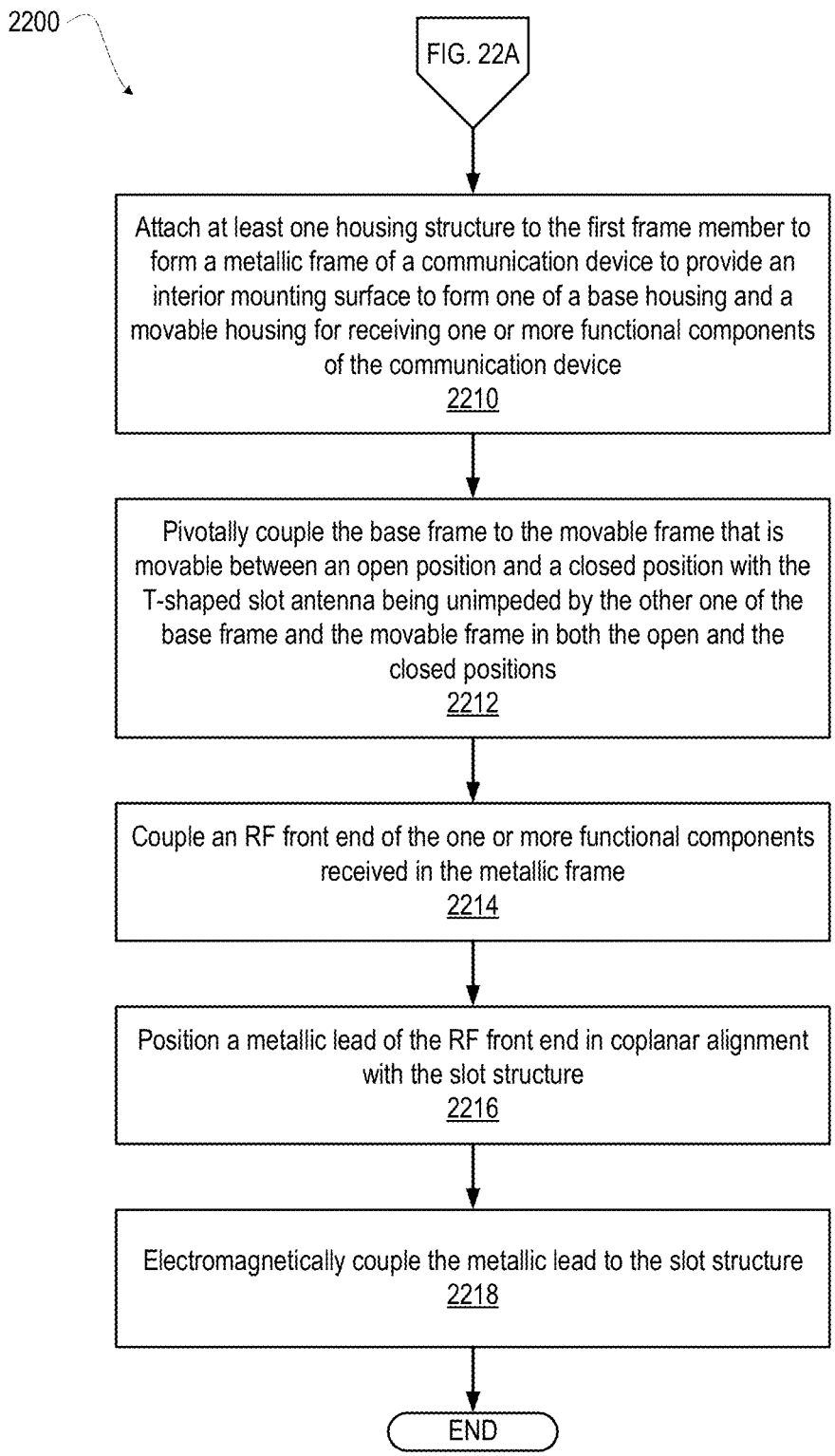

FIGS. 22A-22B (FIG. 22) present a flow diagram of a method for making a T-shaped slot antenna in a rigid frame of a communication device. Relative to a design that incorporates a full lateral cut through the metal frame, the rigid frame resists twisting and bending of the communication device even with the introduction of the T-shaped slot antenna. In one or more embodiments, the T-shaped slot antenna is positioned to be unimpeded by opening and closing of the communication device and at location in the frame that does not affect the rigidity of the communication device to prevent twisting and bending. The description of method 2200 is provided with general reference to the specific components illustrated within the preceding FIGS. 1-21. In at least one embodiment, method 2200 can be implemented using manufacturing system 2100 having controller 2102 that executes manufacturing application 2104. With reference to FIG. 22A, method 2200 includes making a first frame member from metallic stock material, the first frame member having a first portion and a second portion that extend longitudinally adjacent (block 2202). In one embodiment, making the first frame member includes cutting a metallic band from sheet metal stock (block 2204). The metallic band has the first portion and the second portion of the first frame member that extend longitudinally adjacent down a length of the metallic band. In one or more embodiments, the first frame member is formed by a select one of molding, three-dimensional printing, or machining.

A metallic frame assembly of communication device 100 (FIG. 1) includes a base metallic frame of base housing 158 (FIG. 1) having first, second, third and fourth frame members. In one or more embodiments, the base metallic frame is formed from a metallic band. First frame member is a left side of the base metallic frame. Second frame member is an inward (pivot) side of base metallic frame. Third frame member is a right side of base metallic frame, opposite to first frame member. Fourth frame member is an outward side of base metallic frame, opposite to second frame member.

Metallic frame assembly includes flip metallic frame of flip housing 157 (FIG. 1), which has first, second, third and fourth frame members. In one or more embodiments, flip metallic frame is formed from a metallic band. First frame member is a left side of flip metallic frame. Second frame member is a pivot side of flip metallic frame. Third frame member is a right side of flip metallic frame opposite to the first frame member. Fourth frame member is an outward side of the flip metallic frame, opposite to second frame member. At least one of the frame members of base metallic frame and the frame members of flip metallic frame has adjacent first and second portions. The first portion extends uninterrupted across one lateral side of the metallic frame to provide structural support to the corresponding one of the base metallic frame and flip metallic frame. The second portion is reserved for fabricating T-shaped slot antenna 102.

With reference to FIG. 22A, method 2200 includes making a T-shaped slot antenna in the second portion of the first frame member in the metallic band. The T-shaped slot antenna has first and second arms separated at a gap and partially encompassing a slot (block 2206). Method 2200 includes bending the metallic band into a circumferential metallic band of the metallic frame (block 2208).

With reference to FIG. 22B, method 2200 includes attaching at least one housing structure to the first frame member to form a metallic frame of a communication device to provide an interior mounting surface to form one of a base housing and a movable housing for receiving one or more functional components of the communication device (block 2210). One of the base frame and the movable frame includes the first frame member that is laterally positioned and orthogonal to a front side that is exposed in the open position and folded by the movable frame in the closed position. Method 2200 includes pivotally coupling the base frame to the movable frame that is movable between an open position and a closed position with the T-shaped slot antenna being unimpeded by the other one of the base frame and the movable frame in both the open and the closed positions (block 2212). Method 2200 includes installing an RF front end of the one or more functional components in the metallic frame (block 2214). Method 2200 includes positioning a metallic lead of the RF front end in coplanar alignment with the T-shot slot antenna (block 2216). Method 2200 includes electromagnetically coupling the metallic lead to the T-shape slot antenna (block 2218). Then method 2200 ends.

In one or more embodiments, coupling the RF front end to the T-shaped slot antenna in block 2212 includes: (i) aligning a PCB with the first portion of the first frame member and a planar surface of the PCB with the slot; and (ii) coupling the PCB to the metallic frame. Also, positioning the metallic lead of the RF front end includes attaching a metallic trace to the planar surface of the PCB. In one or more particular embodiments, electromagnetically coupling the metallic lead to the slot includes electrically connecting an ideal feed to the slot. In one or more particular embodiments, electromagnetically coupling the metallic lead to the slot includes attaching a capacitive plate to the PCB that extends into the slot and is proximate to and spaced apart from at least one of the first arm and the second arm. In one or more particular embodiments, attaching the capacitive plate to the PCB includes positioning the capacitive plate to extend in close proximity to the gap and a portion of both the first arm and the second arm, the first arm and the second arm having different lengths, the capacitive plate to excite respective first and second antenna resonant frequencies that relate, respectively, to the length of the first and the second arms.

In the above described flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
a metallic frame having an interior mounting surface for receiving one or more functional components and comprising a first frame member having a first portion extending uninterrupted across one lateral side of the metallic frame, the first portion providing structural support to the communication device, the metallic frame being a base metallic frame;
a T-shaped slot antenna formed in a second portion of the first frame member adjacent to the first portion, the T-shaped slot antenna having first and second arms separated at a gap and partially encompassing a slot;
wherein the second portion of the first frame member enables radio frequency communication by at least one of the functional components via the T-shaped slot antenna of the communication device; and
a base cover that comprises plastic fill portions that close openings in the base metallic frame, the base cover attached over a back portion of the base metallic frame.

2. The communication device of claim 1, wherein the metallic frame comprises a base frame and a movable frame that is pivotally coupled to the base frame between an open position and a closed position, one of the base frame and the movable frame comprising the first frame member that is laterally positioned, a front side of the base frame and the movable frame is exposed in the open position and folded in the closed position, the T-shaped slot antenna unimpeded by the base frame and the movable frame in both the open and the closed positions.

3. The communication device of claim 1, wherein the metallic frame comprises a metallic band extending around a circumference of the communication device to resist twisting and bending of the communication device, the metallic band comprising the first frame member, a second frame member opposite to the first frame member, a third frame member connecting first ends respectively of the first and the second frame members, and a fourth frame member connecting second ends respectively of the first and the second frame members.

4. The communication device of claim 1, wherein the one or more functional components received in the metallic frame comprises a radio frequency (RF) front end and a metallic lead that is coplanar with and that is electromagnetically coupled to the slot.

5. The communication device of claim 4, further comprising a printed circuit board (PCB) coupled to the metallic frame and aligned with the first portion of the first frame member, the PCB providing a planar surface aligned with the slot and that supports the RF front end, the metallic lead comprising:
a metallic trace attached to the planar surface of the PCB; and
an electromagnetic coupling conductor attached to the planar surface and electrically connected to the metallic trace.

6. The communication device of claim 5, wherein the electromagnetic coupling conductor is an ideal feed that is electrically connected to the slot.

7. The communication device of claim 6, wherein the electromagnetic coupling conductor comprises a capacitive plate extending into the slot and which is proximate to and spaced apart from at least one of the first arm and the second arm of the T-shaped slot antenna.

8. The communication device of claim 7, wherein the capacitive plate extends in close proximity to the gap and a portion of the first arm and a portion of the second arm, the first arm and the second arm having different lengths, the capacitive plate exciting during transmission and being excited during reception by respective first and second antenna resonant frequencies that relate, respectively, to the length of the first and the second arms.

9. The communication device of claim 1, further comprising a nonconductive material that fills the T-shaped slot antenna.

10. A method comprising:
making a first frame member from metallic stock material, the first frame member having a first portion and a second portion that extend longitudinally adjacent;
making a T-shaped slot antenna in the second portion of the first frame member, the T-shaped slot antenna having first and second arms separated at a gap and partially encompassing a slot;
attaching at least one housing structure to the first frame member to form a metallic frame of a communication device to provide an interior mounting surface for receiving one or more functional components of the communication device, wherein the second portion of the first frame member enables radio frequency communication by at least one of the functional components via the T-shaped slot antenna of the communication device; and
attaching a base cover over a back portion of the base metallic frame, the base cover comprising plastic fill portions that close openings in the base metallic frame.

11. The method of claim 10, wherein attaching the at least one housing structure to the first frame member to form the metallic frame comprises pivotally coupling a base frame to a movable frame that is movable between an open position and a closed position, one of the base frame and the movable frame comprising the first frame member that is laterally positioned, a front side of the base frame and the movable frame is exposed in the open position and folded in the closed position, the T-shaped slot antenna unimpeded by the base frame and the movable frame in both the open and the closed positions.

12. The method of claim 10, further comprising
forming a circumferential metallic band having the first portion and the second portion of the first frame member that extend in longitudinally adjacent down a length of the metallic band, the metallic band comprising the first frame member, a second frame member opposite to the first frame member, a third frame member connecting first ends respectively of the first and the second frame members, and a fourth frame member connecting second ends respectively of the first and the second frame members.

13. The method of claim 10, further comprising:
coupling a radio frequency (RF) front end of the one or more functional components received in the metallic frame;
positioning a metallic lead of the RF front end in coplanar alignment with the slot; and
electromagnetically coupling the metallic lead to the slot.

14. The method of claim 13, wherein:
coupling the RF front end comprises:
   aligning a printed circuit board (PCB) with the first portion of the first frame member and a planar surface of the PCB with the slot; and
   coupling the PCB to the metallic frame; and
   positioning the metallic lead of the RF front end comprises attaching a metallic trace to the planar surface of the PCB.

15. The method of claim 14, wherein electromagnetically coupling the metallic lead to the slot comprises one of (i) electrically connecting an ideal feed to the slot, or (ii) attaching a capacitive plate to the PCB that extends into the slot and is proximate to and spaced apart from at least one of the first arm and the second arm.

16. The method of claim 15, wherein attaching the capacitive plate to the PCB comprises positioning the capacitive plate to extend across the gap and a portion of the first arm and a portion of the second arm, the first arm and the second arm having different lengths, the capacitive plate to excite respective first and second antenna resonant frequencies that relate, respectively, to the length of the first and the second arms.

* * * * *